United States Patent
Santori et al.

(10) Patent No.: US 9,529,752 B2
(45) Date of Patent: *Dec. 27, 2016

(54) METHOD AND APPARATUS FOR COMMUNICATION BETWEEN A VEHICLE BASED COMPUTING SYSTEM AND A REMOTE APPLICATION

(75) Inventors: Nello Joseph Santori, Canton, MI (US); David P. Boll, Grosse Pointe Park, MI (US); L. Mark Shaker, Wixom, MI (US); Micah J. Kaiser, Westland, MI (US); Mark Schunder, South Lyon, MI (US); Joseph N. Ross, Oakland, CA (US)

(73) Assignee: Ford Global Technologies, LLC, Dearborn, MI (US)

( * ) Notice: Subject to any disclaimer, the term of this patent is extended or adjusted under 35 U.S.C. 154(b) by 947 days.

This patent is subject to a terminal disclaimer.

(21) Appl. No.: 13/189,687

(22) Filed: Jul. 25, 2011

(65) Prior Publication Data

US 2013/0029599 A1 Jan. 31, 2013

(51) Int. Cl.
*H04M 1/00* (2006.01)
*G06F 13/38* (2006.01)
*H04M 1/60* (2006.01)

(52) U.S. Cl.
CPC .......... *G06F 13/385* (2013.01); *H04M 1/6091* (2013.01); *H04M 2250/02* (2013.01)

(58) Field of Classification Search
CPC .................................................... H04B 1/3822
USPC ................... 455/345, 569.2, 41.1, 41.2, 41.3
See application file for complete search history.

(56) References Cited

U.S. PATENT DOCUMENTS

| | | |
|---|---|---|
| 6,526,335 B1 | 2/2003 | Treyz et al. |
| 7,207,041 B2 | 4/2007 | Elson et al. |
| 7,266,435 B2 | 9/2007 | Wang et al. |
| 7,505,784 B2 | 3/2009 | Barbera |
| 7,602,782 B2 | 10/2009 | Doviak et al. |
| 7,801,941 B2 | 9/2010 | Conneely et al. |

(Continued)

OTHER PUBLICATIONS

IPhone Hacks, Apple Files Patent Which Allow You to Control Your Computer Remotely Using IPhone, http://www.iphonehacks.com/2009/12/apple-files-patent-which-could-allow-you-to-control-your-computer-remotely-using-iphone, Jun. 22, 2010.

(Continued)

*Primary Examiner* — Wen Huang
(74) *Attorney, Agent, or Firm* — Jennifer Stec; Brooks Kushman P.C.

(57) ABSTRACT

A vehicle-based computing apparatus includes a computer processor in communication with persistent and non-persistent memory. The apparatus also includes a local wireless transceiver in communication with the computer processor and configured to communicate wirelessly with a wireless device located at the vehicle. The processor is operable to receive, through the wireless transceiver, a connection request sent from a nomadic wireless device, the connection request including at least a name of an application seeking to communicate with the processor. The processor is further operable to receive at least one secondary communication from the nomadic device, once the connection request has been processed. The secondary communication is at least one of a speak alert command, a display text command, a create phrase command, and a prompt and listen command.

8 Claims, 7 Drawing Sheets

(56) References Cited

U.S. PATENT DOCUMENTS

| | | | |
|---|---|---|---|
| 8,046,501 B2 | 10/2011 | Gormley | |
| 8,078,397 B1* | 12/2011 | Zilka | 701/414 |
| 8,190,130 B2 | 5/2012 | Dillon | |
| 8,346,310 B2* | 1/2013 | Boll et al. | 455/569.2 |
| 8,402,145 B2 | 3/2013 | Holden et al. | |
| 8,577,424 B2 | 11/2013 | Boll et al. | |
| 2002/0098853 A1 | 7/2002 | Chrumka | |
| 2003/0046586 A1 | 3/2003 | Bheemarasetti et al. | |
| 2003/0079123 A1 | 4/2003 | Mas Ribes | |
| 2003/0147534 A1 | 8/2003 | Ablay et al. | |
| 2004/0203660 A1 | 10/2004 | Tibrewal et al. | |
| 2004/0260438 A1 | 12/2004 | Chernetsky et al. | |
| 2004/0267585 A1 | 12/2004 | Anderson et al. | |
| 2005/0075095 A1 | 4/2005 | Dillon | |
| 2005/0091408 A1 | 4/2005 | Parupudi et al. | |
| 2005/0177635 A1 | 8/2005 | Schmidt et al. | |
| 2006/0150197 A1 | 7/2006 | Werner | |
| 2006/0156315 A1 | 7/2006 | Wood et al. | |
| 2006/0190097 A1 | 8/2006 | Rubenstein | |
| 2006/0287787 A1 | 12/2006 | Engstrom et al. | |
| 2006/0287821 A1 | 12/2006 | Lin | |
| 2007/0016362 A1 | 1/2007 | Nelson | |
| 2007/0042809 A1 | 2/2007 | Angelhag | |
| 2007/0042812 A1 | 2/2007 | Basir | |
| 2007/0050854 A1 | 3/2007 | Cooperstein et al. | |
| 2007/0132572 A1 | 6/2007 | Itoh et al. | |
| 2007/0135087 A1* | 6/2007 | Villevieille et al. | 455/403 |
| 2007/0294625 A1 | 12/2007 | Rasin et al. | |
| 2008/0148374 A1 | 6/2008 | Spaur et al. | |
| 2008/0195305 A1* | 8/2008 | Jendbro et al. | 701/200 |
| 2008/0220718 A1 | 9/2008 | Sakamoto et al. | |
| 2008/0313050 A1 | 12/2008 | Basir | |
| 2009/0075624 A1 | 3/2009 | Cox et al. | |
| 2009/0106036 A1 | 4/2009 | Tamura et al. | |
| 2009/0117890 A1 | 5/2009 | Jacobsen et al. | |
| 2009/0228908 A1 | 9/2009 | Margis et al. | |
| 2009/0253466 A1 | 10/2009 | Saito et al. | |
| 2009/0318119 A1 | 12/2009 | Basir et al. | |
| 2010/0063670 A1 | 3/2010 | Brzezinski et al. | |
| 2010/0094996 A1 | 4/2010 | Samaha | |
| 2010/0098853 A1 | 4/2010 | Hoffmann et al. | |
| 2010/0216509 A1 | 8/2010 | Riemer et al. | |
| 2010/0234071 A1 | 9/2010 | Shabtay et al. | |
| 2010/0251283 A1* | 9/2010 | Smith | 725/25 |
| 2010/0306309 A1 | 12/2010 | Santori et al. | |
| 2011/0093137 A1* | 4/2011 | Moinzadeh et al. | 701/2 |
| 2011/0105097 A1 | 5/2011 | Tadayon et al. | |
| 2011/0112762 A1 | 5/2011 | Gruijters et al. | |
| 2011/0195659 A1 | 8/2011 | Boll et al. | |
| 2011/0296037 A1 | 12/2011 | Westra et al. | |
| 2012/0054300 A1 | 3/2012 | Marchwicki et al. | |
| 2012/0079002 A1 | 3/2012 | Boll et al. | |
| 2012/0183221 A1* | 7/2012 | Alasry et al. | 382/181 |
| 2012/0197523 A1* | 8/2012 | Kirsch | 701/426 |
| 2013/0084847 A1 | 4/2013 | Tibbitts et al. | |

OTHER PUBLICATIONS

Zack Newmark, American, Concept Car, Ford, Gadgets, Lifestyle, Technology, Student develop in-car cloud computing apps; envision the future of in-car connectivity, May 4, 2010, http://ww.woldcarfans.com/print/110050425986/student-develop-in-car-cloud-computing_apps;_envision_the_future_of_in-car_connectivity.

Wikipedia, the free encyclopedia, X Window System, http://en.wikipedia.org/wiki/X_Window_System, Jun. 22, 20100.

"How PhonEnforcer Works" Turn Off the Cellphone While Driving—PhonEnforcer. Turn Off the Cell Phone LLC. <http://turnoffthecellphone.com/howitworks.htm> Dec. 28, 2010, pp. 1-3.

PhonEnforcer FAQ's Turn Off the Cellphone While Driving—PhonEnforcer. Turn Off the Cell Phone LLC. <http://turnoffthecellphone.com/faq.html> Dec. 28, 2010, pp. 1-2.

Lamberti, Ralph "Daimler Full Circle: The Rise of Vehicle-Installed Telematics-Telematics Munich 2009" Nov. 10, 2009.

European Patent Office, Extended Search Report for corresponding European Patent Application No. 11151623.3-1244 mailed Mar. 11, 20911.

Narasimhan, et al., A lightweight remote display management protocol for mobile devices, Application Research Center, Motorola Labs Schaumburg, IL, 2007, pp. 711-715.

Yarden, et al., TUKI: A Voice-Activated Information Browser, IEEE, 2009, pp. 1-5.

Gil-Castineira, et al., Integration of Nomadic Devices with Automotive User Interfaces, IEEE Transactions on Consumer Electronics, vol. 55, No. 1, Feb. 2009.

Nusser, et al., Bluetooth-based Wireless Connectivity in an Automotive Environment, Robert Bosch GmbH, VTC 2000, pp. 1935-1942.

Ford Motor Company, "SYNC with Navigation System," Owner's Guide Supplement, SYNC System Version 1 (Jul. 2007).

Ford Motor Company, "SYNC," Owners's Guide Supplement, SYNC System Version 1 (Nov. 2007).

Ford Motor Company, "SYNC with Navigation System," Owner's Guide Supplement, SYNC System Version 2 (Oct. 2008).

Ford Motor Company, "SYNC," Owner's Guide Supplement, SYNC System Version 2 (Oct. 2008).

Ford Motor Company, "SYNC with Navigation System," Owner's Guide Supplement, SYNC System Version 3 (Jul. 2009).

Ford Motor Company, "SYNC," Owner's Guide Supplement, SYNC System Version 3 (Aug. 2009).

Kermit Whitfield, "A hitchhiker's guide to the telematics ecosystem," Automotive Design & Production, Oct. 2003, http://findarticles.com, pp. 103.

Service Discovery Protocol (SDP) Layer Tutorial, Palowireless Bluetooth Research Center, http://www.palowireless.com/infotooth/tutorial/sdp.asp. Aug. 3, 2010.

Iphone Hacks, Apple Files Patent Which Allow You to Control Your Computer Remotely Using IPhone, http://www. Iphonehacks.com/2009/12/apple-files-patent-which-could-allow-you-to-control-your-computer-remotely-using-iphone, Jun. 22, 2010.

Zack Newmark, American, Concept Car, Ford, Gadgets, Lifestyle, Technology, Student develop in-car cloud aomputing apps; envision the future of in-car connectivity, May 4, 2010, http://ww.woldcarfans.com/print/110050425986/student-develop-in-car-cloud-computing_apps;_envision_thefuture_of in-car_connectivity.

Wikipedia, the free encyclopedia, X Window System, http://en.wikipedia.orgiwiki/X_Window_System, Jun. 22, 2010.

Darryl Chantry, MSDN, Mapping Applications to the Cloud, 2010 Microsoft Corporation, Platform Architecture Team, Jan. 2009, http://msdn.microsoft.com/en-us/library/dd430340(printer).aspx, Jun. 18, 2010.

"MobileSafer is your personal safe driving assistant", 2010 ZoomSafer Inc. <http://zoomsafer.com/products/mobilesafer> Dec. 28, 2010.

"How PhonEnforcer Works" Turn Off the Cellphone While Driving-PhonEnforcer. Turn Off the Cell Phone LLC. <http://turnoffthecellphone.com/howitworks.htm> Dec. 28, 2010, pp. 1-3.

"PhonEnforcer FAQ's" Turn Off the Cellphone While Driving-PhonEnforcer. Turn Off the Cell Phone LLC. <http://turnoffthecellphone.com/faq.html> Dec. 28, 2010, pp. 1-2.

Lamberti, Ralph "Daimler Full Circle: The Rise of Vehicle-Installed Telematics- Telematics Munich 2009" Nov. 10, 2009.

Chinese Patent Office, First Office Action for the corresponding Chinese Patent Application No. 201310727405.0 mailed Dec. 16, 2014.

European Patent Office, Extended Search Report for corresponding European Patent Application No. 11151623.3.1244 mailed Mar. 11, 2011.

Narasimhan et al., A lightweight remote display management protocol for mobile devices, Application Research enter, Motorola Labs, Schaumburg, IL 2007, pp. 711-715.

Voelcker, Top 10 Tech Cars It's the Environment, Stupid, www.spectrum.ieee.org, Apr. 2008, pp. 26-35.

(56) References Cited

OTHER PUBLICATIONS

Yarden et al., TUKI: A Voice-Activated Information Browser, IEEE, 2009, pp. 1-5.
Gil-Castineira et al., Integration of Nomadic Devices with Automotive User Interfaces, IEEE Transactions on Consumer Electronics, vol. 55, No. 1, Feb. 2009.
Nusser et al., Bluetooth-based Wireless Connectivity in an Automotive Environment, Robert Bosch GmbH, VTC 2000, pp. 1935-1942.
Antuan Goodwin, The Car Tech Blog, Ford Unveils open-source Sync developer platform, http://reviews.cnet.com/8301-13746_7-10385619-48.html, Oct. 2009, pp. 1-5.

* cited by examiner

METHOD AND APPARATUS FOR COMMUNICATION BETWEEN A VEHICLE BASED COMPUTING SYSTEM AND A REMOTE APPLICATION

TECHNICAL FIELD

The illustrative embodiments generally relate to a method and apparatus for communication between a vehicle based computing system and a remote application.

BACKGROUND

Vehicle based computing systems, such as the FORD SYNC system are growing in popularity. Using various sources of vehicle information, driver inputs and connections to vehicle systems, the SYNC system can add a variety of functionality and novelty to the driving experience.

Furthermore, systems such as SYNC can often communicate with remote devices either to gain information from those devices, or to use those devices to access a remote network. For example, in one instance, SYNC can communicate with a cellular phone, and use the cellular phone's ability to communicate with a remote network to send and receive information to and from the remote network. In another example, SYNC can query a GPS navigational device, such as a TOMTOM, and receive navigational information.

In addition to querying a device, such as a TOMTOM to receive navigational information, SYNC can also communicate with the TOMTOM and provide instructions, often comparable to pressing a selection on the TOMTOM's screen, through the SYNC system. The instructions can be provided, for example, by a spoken driver command processed through the SYNC system.

SUMMARY

In a first illustrative implementation, a vehicle-based computing apparatus includes a computer processor in communication with persistent and non-persistent memory. The apparatus also includes a local wireless transceiver in communication with the computer processor and configured to communicate wirelessly with a wireless device located at the vehicle.

In this illustrative embodiment, the processor is operable to receive, through the wireless transceiver, a connection request sent from the wireless device, the connection request including at least an identifier of an application seeking to communicate with the processor.

The processor is further operable to receive at least one secondary communication from the wireless device, once the connection request has been processed.

In another illustrative embodiment, a wireless device includes a processor in communication with at least persistent and non-persistent memory and a wireless transceiver operable to communicate with a vehicle-based computing system.

In this illustrative embodiment, the persistent memory stores instructions, possibly as part of an application, that, when executed by the processor, are operable to cause communication between the wireless device and the vehicle-based computing system.

According to this illustrative implementation, the stored instructions, when executed by the processor, cause an initial connection request to establish a connection between an application stored on the wireless apparatus and the vehicle-based computing system.

The stored instructions further, when executed by the processor, cause at least one secondary communication to be sent to the processor, the communication pertaining to the operation of the application.

In yet another illustrative embodiment, a method of communication between an application stored on a wireless device and a vehicle-based computing system includes receiving, at the vehicle-based computing system, a request initiated by the application to connect the application to the vehicle-based computing system.

The illustrative method further includes establishing communication between the vehicle-based computing system, and the application on the wireless device. The exemplary method also includes receiving, at the vehicle-based computing system, at least a second communication pertaining to the operation of the application.

These figures are not exclusive representations of the systems and processes that may be implemented to carry out the inventions recited in the appended claims. Those of skill in the art will recognize that the illustrated system and process embodiments may be modified or otherwise adapted to meet a claimed implementation of the present invention, or equivalents thereof.

DETAILED DESCRIPTION

The present invention is described herein in the context of particular exemplary illustrative embodiments. However, it will be recognized by those of ordinary skill that modification, extensions and changes to the disclosed exemplary illustrative embodiments may be made without departing from the true scope and spirit of the instant invention. In short, the following descriptions are provided by way of example only, and the present invention is not limited to the particular illustrative embodiments disclosed herein.

Figure 1:
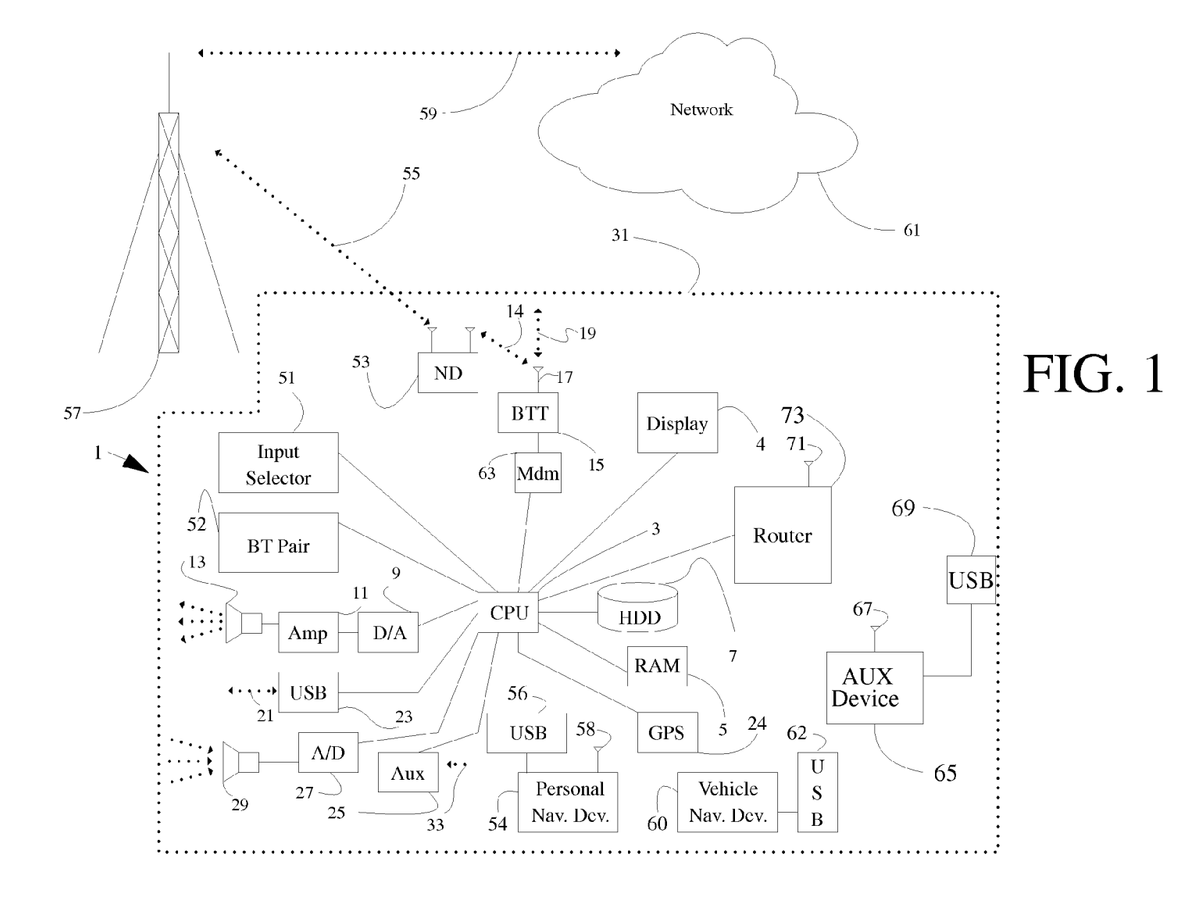
FIG. 1 shows an illustrative exemplary vehicle based computing system and illustrative interaction of the system with an illustrative remote network.

FIG. 1 illustrates an example block topology for a vehicle based computing system 1 for a vehicle 31. A vehicle enabled with a vehicle-based computing system may contain a visual front end interface 4 located in the vehicle. The user may also be able to interact with the interface if it is provided, for example, with a touch sensitive screen. In another illustrative embodiment, the interaction occurs through, button presses, audible speech and speech synthesis.

In the illustrative embodiment 1 shown in FIG. 1, a processor 3 controls at least some portion of the operation of the vehicle-based computing system. Provided within the vehicle, the processor allows onboard processing of commands and routines. Further, the processor is connected to both non-persistent 5 and persistent storage 7. In this illustrative embodiment, the non-persistent storage is random access memory (RAM) and the persistent storage is a hard disk drive (HDD) or flash memory.

The processor is also provided with a number of different inputs allowing the user to interface with the processor. In this illustrative embodiment, a microphone 29, an auxiliary input 25 (for input 33), a USB input 23, a GPS input 24 and a BLUETOOTH input 15 are all provided. An input selector 51 is also provided, to allow a user to swap between various inputs. Input to both the microphone and the auxiliary connector is converted from analog to digital by a converter 27 before being passed to the processor.

Outputs to the system can include, but are not limited to, a visual display 4 and a speaker 13 or stereo system output. The speaker is connected to an amplifier 11 and receives its signal from the processor 3 through a digital-to-analog converter 9. Output can also be made to a remote BLUETOOTH device such as PND 54 or a USB device such as vehicle navigation device 60 along the bi-directional data streams shown at 19 and 21 respectively.

In one illustrative embodiment, the system 1 uses the BLUETOOTH transceiver 15 to communicate 17 with a user's nomadic device 53 (e.g., cell phone, smart phone, PDA, etc.). The nomadic device can then be used to communicate 59 with a network 61 outside the vehicle 31 through, for example, communication 55 with a cellular tower 57.

Exemplary communication between the nomadic device and the BLUETOOTH Transceiver is represented by signal 14.

Pairing a nomadic device 53 and the BLUETOOTH transceiver 15 can be instructed through a button 52 or similar input, telling the CPU that the onboard BLUETOOTH transceiver will be paired with a BLUETOOTH transceiver in a nomadic device.

Data may be communicated between CPU 3 and network 61 utilizing, for example, a data-plan, data over voice, or DTMF tones associated with nomadic device 53. Alternatively, it may be desirable to include an onboard modem 63 in order to transfer data between CPU 3 and network 61 over the voice band. In one illustrative embodiment, the processor is provided with an operating system including an API to communicate with modem application software. The modem application software may access an embedded module or firmware on the BLUETOOTH transceiver to complete wireless communication with a remote BLUETOOTH transceiver (such as that found in a nomadic device). In another embodiment, nomadic device 53 includes a modem for voice band or broadband data communication. In the data-over-voice embodiment, a technique known as frequency division multiplexing may be implemented when the owner of the nomadic device can talk over the device while data is being transferred. At other times, when the owner is not using the device, the data transfer can use the whole bandwidth (300 Hz to 3.4 kHz in one example).

If the user has a data-plan associated with the nomadic device, it is possible that the data-plan allows for broad-band transmission and the system could use a much wider bandwidth (speeding up data transfer). In still another embodiment, nomadic device 53 is replaced with a cellular communication device (not shown) that is affixed to vehicle 31.

In one embodiment, incoming data can be passed through the nomadic device via a data-over-voice or data-plan, through the onboard BLUETOOTH transceiver and into the vehicle's internal processor 3. In the case of certain temporary data, for example, the data can be stored on the HDD or other storage media 7 until such time as the data is no longer needed.

Additional sources that may interface with the vehicle include a personal navigation device 54, having, for example, a USB connection 56 and/or an antenna 58; or a vehicle navigation device 60, having a USB 62 or other connection, an onboard GPS device 24, or remote navigation system (not shown) having connectivity to network 61.

Further, the CPU could be in communication with a variety of other auxiliary devices 65. These devices can be connected through a wireless 67 or wired 69 connection. Also, or alternatively, the CPU could be connected to a vehicle based wireless router 73, using for example a WiFi 71 transceiver. This could allow the CPU to connect to remote networks in range of the local router 73.

Figure 2:
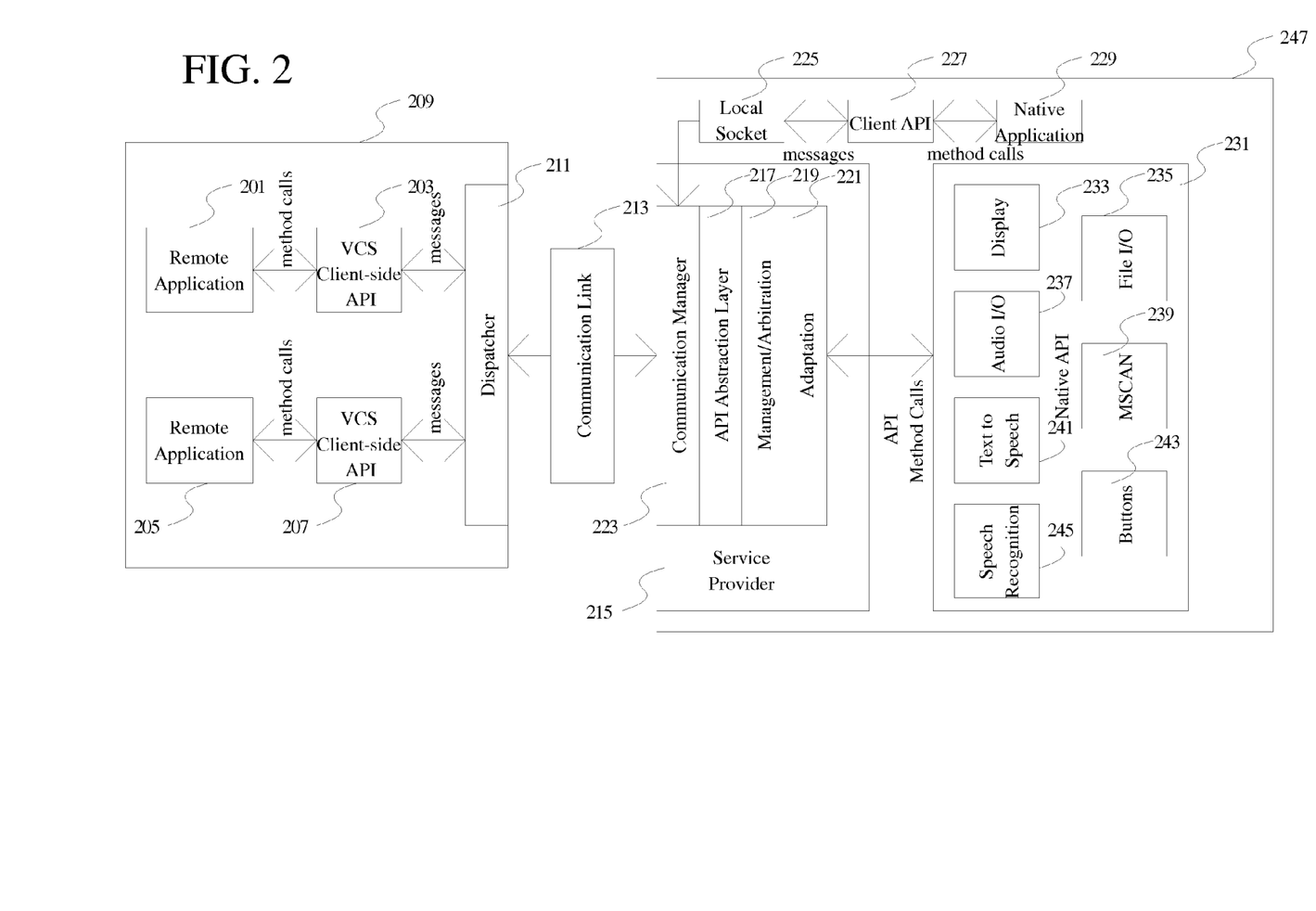
FIG. 2 shows an illustrative exemplary remote device running one or more applications in communication with a vehicle based computing system.

FIG. 2 shows an illustrative exemplary remote device running one or more applications in communication with a vehicle based computing system. In this illustrative embodiment, a remote device 209 (e.g., without limitation, a cell phone, PDA, GPS device, etc.) has one or more remote applications 201, 205 stored thereon. The remote applications communicate with the vehicle based computing system 247, using a vehicle computing system (VCS) client side API 203, 207. This API could, for example, be provided to developers in advance, and define the format of outgoing and incoming packets so that communication between the remote device 209 and the vehicle based computing system 247 is possible. A dispatcher 211 can be provided to the remote device 209 if more than one application is communicating at the same time.

Data is passed from the remote device to the vehicle communication system through a communication link 213. This can be a wired or wireless link, and can be half or full duplex. In one non-limiting example, the link is a BLUETOOTH link.

The vehicle based communication system has various applications stored thereon, including, but not limited to: a communications manager 223, an API abstraction application 217, a management and arbitration application 219, and a adaptation application 221 (these applications can also be layers of a single or plurality of applications, such as a service provider application 215).

In this exemplary implementation, the communication manager 223 handles all transports, forwarding incoming messages to the abstraction application (or layer) 217, and ensuring that outgoing messages are sent via the proper transport channel.

In this exemplary implementation, the abstraction application 217 transforms incoming messages into action to be performed by a service and creates outgoing messages out of information and events from local modules.

In this exemplary implementation, the management and arbitration application 219 virtualizes the local vehicle based computing system for each application by managing use of HMI elements and governing resource consumption.

In this exemplary implementation, the adaptation application 221 encapsulates the local API and coexistence with core local applications. This application may be modified or replaced to allow a communication connection to compatible with different versions of the vehicle based computing system software.

In at least one exemplary implementation, a message protocol will be used to encode messages exchanged between a mobile client and the vehicle based computing system to command and control a Human Machine Interface (HMI) for purposes such as displaying and speaking text, listening, propagating button-pushes, etc. These messages may contain small amounts of data (e.g. text phrases, button identifiers, status, thumb-drive file data, configuration data, etc.). This protocol, using complementary support provided by the message specification, will permit multiple client application sessions to concurrently use a single transport channel.

Other open standard protocols may be used where appropriate and available, such as the A2DP BLUETOOTH profile for streaming audio from the mobile device to the vehicle audio system (not all mobile devices support A2DP). However, some open standard protocols are not always available on every mobile device, or are not always implemented uniformly. In addition, API support for use of these protocols may not be uniformly implemented on all mobile platforms. Therefore, the function of some open standard protocols (e.g. OBEX) may be provided as part of the message protocol, when it is technically simple enough to do and a significant increase in uniformity can be achieved across platforms.

Transports may be configured to support full-duplex communication in order to provide prompt event propagation between client applications and the vehicle based computing system. A transport may also support multiple concurrent channels in order to permit concurrent connections from one or more devices.

One or more exemplary transports are Serial (RS232) and TCP/IP. Serial transport communication with mobile devices may provided, for example, through a BLUETOOTH Serial Profile. Most mobile devices support this profile, and most provide a common programming model for its use. The serial programming model is widely used and highly uniform. If the vehicle based computing system provides Serial-over-USB support, then the Serial transport could be used with any mobile device that is USB-connected to the vehicle based computing system (if that mobile device provides support for Serial over its USB connection).

In addition, a TCP/IP transport provides the ability for applications running on the vehicle based computing system to use the local HMI. If the module provides external TCP/IP connectivity in the future, this transport will allow external clients to connect over that TCP/IP connectivity. The socket programming model (including the API) for TCP/IP is typically highly portable. Such an example would be a locally loaded application 229, using a client-side API 227 to communicate through a local socket 225.

In at least one exemplary embodiment, the decoupled nature of the system, where the vehicle based computing system is unaware of client applications until they connect, demands a discovery mechanism whereby system and the mobile device client can discover each other's existence and capabilities.

Dual discovery is possible, whereby the mobile device client will be able to discover the environment, locale and HMI capabilities of the local platform and the system will be able to discover the applications available on a remote device and have the ability to launch those applications.

In this illustrative embodiment, the native API 231 has various services associated therewith, that can be accessed by remote devices through function calls. For example, a display function 233 may be provided.

The system may provide an API allowing client applications to write to vehicle displays and query their characteristics. The characteristics of each display may be described generically such that client applications will not require hard coding for individual display types (Type 1 FDM, Type 3 GAP, Type 6 Navigation, etc). Specifically, the system may enumerate each display and indicate each display's intended usage (primary or secondary display). Furthermore, the system may enumerate the writable text fields of each display, provide each writable text field's dimensions, and indicate each field's intended general usage. To promote consistency with the current user interface, support for the scrolling of long text may also be included, where permitted by driver distraction rules.

The system may also include text to speech capability 241. The system may provide an API allowing client applications to leverage the vehicle based computing system's text-to-speech functionality. Client applications may also be able to interleave the play of audio icons with spoken text. They may be able to utilize preexisting audio icons or provide short audio files of their own. The format of application provided audio files will be limited to those natively supported.

Further functionality of the illustrative embodiments may include one or more button inputs 243. One example of this would be controlling an application on a remote device through use of buttons installed in a vehicle (such as steering wheel buttons).

Another exemplary function could be a speech recognition function 245. The system may provide an API allowing client applications to leverage the vehicle based computing system's speech recognition capabilities. The system may also simplify the vehicle based computing systems' native speech recognition APIs to provide a simpler development model for client application developers. The speech grammar APIs will also be simplified while retaining most of the native API's flexibility. For example, the system (on behalf of client applications) will recognize global voice commands such as "BLUETOOTH Audio" or "USB" and pass control to the appropriate application.

Audio I/O 237 may also be provided in an exemplary implementation. The system may provide regulated access to the HMI while enforcing the interface conventions that are coded into core applications. A single "in focus" client application may be allowed primary access to the display, buttons, audio capture or speech engine. Client applications without focus (e.g. Text Messaging, Turn By Turn Navigation, etc.) will be allowed to make short announcements (e.g. "New Message Arrived" or "Turn Left"). Stereo audio may continue to play after a mobile device audio application.

The system may provide an API allowing client applications to capture audio recorded using a microphone. The client application may specify duration of the capture, though capture can be interrupted at any time. Captured audio may be returned to the client application or stored on a local or portable drive.

Additionally, file I/O 235 may also be provided with the system. For example, the system may provide an API allowing client applications to read from, write to, create and/or delete files on a remote drive. Access to the remote drive file system may be restricted in that a client application may only read/edit data in a directory specific to that client application.

The system will provide an API allowing client applications to add, edit, and remove contacts to a phonebook.

These contacts will later be used in voice commands or phonebook menu to dial a BLUETOOTH-connected phone. Contacts sent by client applications may be validated to ensure they do not violate constraints.

A similar interface may be provided to allow client applications to add/replace a ring tone that will sound when the BLUETOOTH-connected phone has an incoming call. The ring tone audio will be checked to ensure it conforms to a preset maximum size and length and that its audio format is compatible with the system.

Finally, the system can provide various forms of security, to ensure both system integrity and driver safety. The system APIs may be limited to prevent inadvertent or malicious damage to the system and vehicle by a client application, including (but not limited to): Limited access to the vehicle CAN bus; limited access to a local file system; no or limited access to audio output volume; no access to disable PTT (push-to-talk), menu, or other buttons that a developer may deem essential; and no access to disable system voice commands or media player source commands.

Additionally, client applications connecting to SyncLink must be approved by the user. For example, the following criteria may be used: the user must install the client application on their mobile device; client applications connecting via BLUETOOTH must be running on a mobile device paired by the user to the vehicle based computing system module on which the system is running; and applications running locally on the module must be installed onto the module by the user.

The system may also use signed and privileged applications. For example, general applications may be signed with a VIN-specific certificate that allows them to interact only with specific vehicle(s). Certificates will be attached to the application install when the user obtains the application from the distribution model. Each certificate will contain an encrypted copy of a VIN-specific key and the application's identity. Upon connecting to the service, the application identity string and certificate are sent. The system decrypts the certificates, and verifies that the VIN key matches the module, and that the application identity matches that which is sent from the application. If both strings do not match, further messages from the application will not be honored. Multiple keys may be included with an application install to allow the application to be used with multiple vehicles.

In another illustrative example, privileged applications must run natively on the module itself. These applications must go through a standard code signing process required for all local applications. Applications that go through this process may not suffer from the same impersonation weakness experienced by general applications.

In yet another illustrative embodiment, one or more applications may publish data for receipt by one or more other applications. Correspondingly, one or more applications may subscribe to one or more data feeds published via the exemplary publish mechanism.

For example, a first application could be a music playing application, and publish data about a song being played by the application. The data can be sent to the system and provided with an ID that allows applications seeking to subscribe to the data to find the data. Alternatively, the vehicle computing system may recognize that data is coming in for subscribers to that type of data, and broadcast that data to the subscribing entities.

A second application, a subscriber, could find and retrieve or be sent the data. The second application, in this example a social networking update program, could then use the data obtained through the subscription to the publication. In this example, the social networking application could update a website informing people as to what music was currently playing in the application user's car.

In addition to acting as a through-way for published data, the vehicle computing system itself could publish data for subscription. For example, GPS data linked to the vehicle computing system could be published by the vehicle computing system and subscribed to by applications desiring to use the data. These are just a few non-limiting examples of how publication/subscription can be used in conjunction with the illustrative embodiments.

An exemplary non-limiting set of API commands may include, but are not limited to:

ClientAppConnect(appName)

Figure 3A:
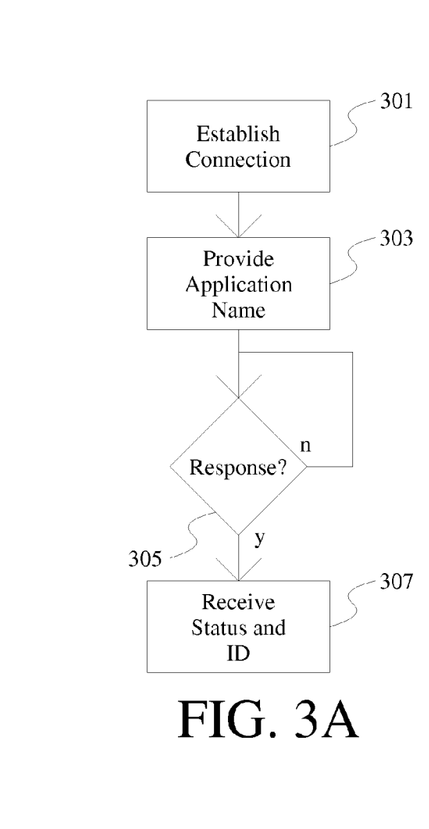
FIGS. 3A-3F show exemplary process flows for exemplary illustrative commands sent from a device to a vehicle-based computing system.

An example flow for this command is shown in FIG. 3A. This command may establish a connection to the vehicle based communication system 301 and provide the application's name 303. This operation may be asynchronous, and thus may need to wait for a response from the system 305. Completion may indicated by receipt of an OnConnectionStatusReceived event which returns connection status and a unique connection ID 307. This connection ID is valid only for the duration of the connection.

appName—name which uniquely identifies this application on the mobile device. This name is unique on the mobile device, but may be used by another application connecting from another mobile device.

ClientAppDisconnect

This exemplary even may close the connection. Any further attempts by the client to use this connection will be ignored.

SpeakText(text, completionCorrelationID)

Figures 3B, 3C:
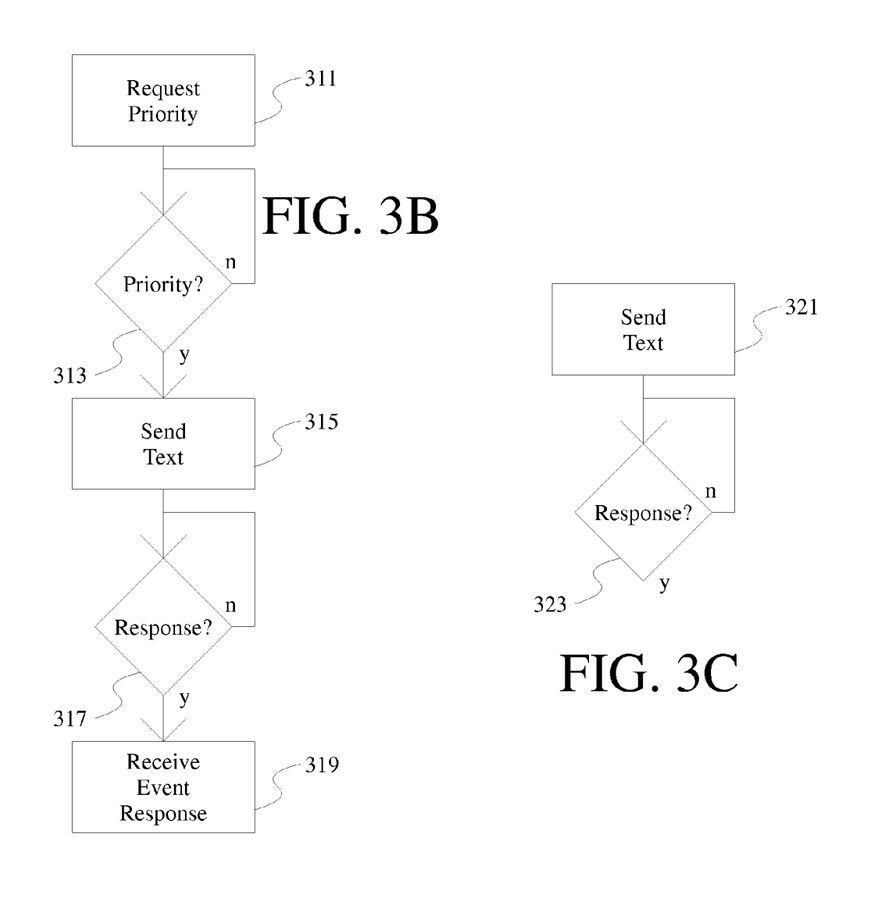

An exemplary flow for this command is shown in FIG. 3B. This command may cause the system to speak the specified text through the vehicle audio system by first acquiring priority for the audio system 311. Once priority is acquired 313, the command sends text 315 and waits for a response 317. Since this text is part of the normal application operation, priority may be required. This operation may be asynchronous and completion may be indicated by receipt of the OnSpeakComplete event 319 which returns a completion reason enumeration.

text—text to be spoken by SYNC completionCorrelationID—identifier to be returned upon completion of speak operation (via OnSpeakComplete event).

SpeakAlert(text, completionCorrelationID)

An exemplary flow for this command is shown in FIG. 3C. This command may speak the specified text through the vehicle audio system. This command may send text 321 and wait for a response 323. In this instance, the API indicates that priority is not required when the command is sent, so that there is no need for priority because this is an alert. This operation is asynchronous and completion may be indicated by the OnSpeakAlertComplete event which returns a completion reason enumeration. This function is, for example, meant to be used by applications which do not currently have focus but which require brief one-way interaction (i.e. speak only, with no user input via voice or buttons possible) with the user.

text—text to be spoken by SYNC completionCorrelationID—identifier to be returned upon completion of speak operation (via OnSpeakAlertComplete event).

DisplayText(text)

Figure 3D:
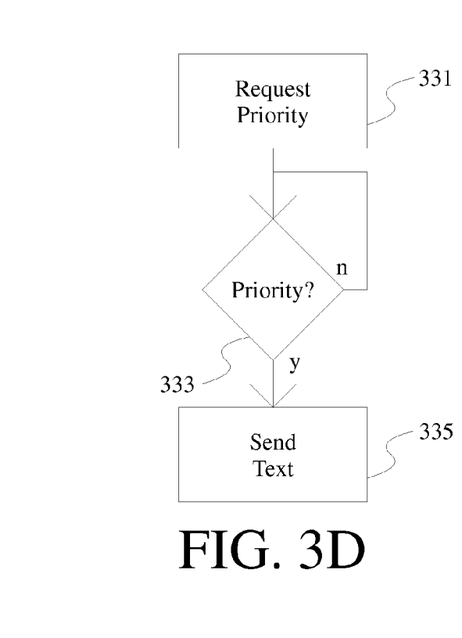

An exemplary flow for this command is shown in FIG. 3D. This command may cause the vehicle based computing system to display specified text on a console display. Priority may also be required. The command first seeks priority 331. Once priority is acquired 333, the text can be sent 335. In at least one embodiment, this should be a very short text string, as the display area may permit as few as twelve characters.

text—text to be displayed on the radio head by SYNC

CreateRecoPhraseSet(phraseList, thresholdIgnore, thresholdReject, completionCorrelationID)

Figure 3E:
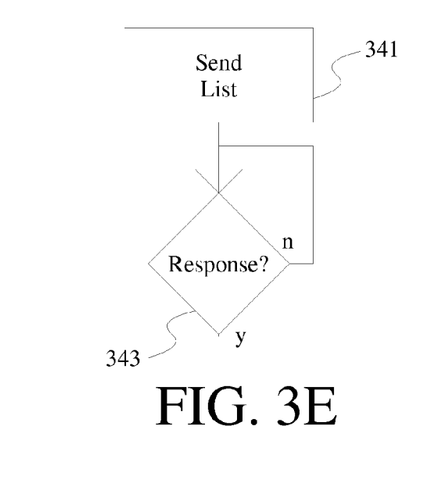

An exemplary flow for this command is shown in FIG. 3E. This command may create a set of phrases that can be listened for during a PromptAndListen operation. The system may send a list of the possible phrases 341 and wait for a response 343 identifying a selected phrase (e.g., without limitation, the response sent by PromptAndListen shown in FIG. 3F). This operation may be asynchronous and completion may be indicated by a OnRecoPhraseSetCreationComplete event which returns a handle to this phrase set for use in subsequent calls to PromptAndListen.

phraseSetList—a list of strings (in .NET, a List<string>) that are to be recognizable.

thresholdIgnore—numeric value (percentage) between 0 and 100 indicating at what recognition confidence percentage must be attained for a phrase to NOT be ignored.

thresholdReject—numeric value (percentage) between 0 and 100 indicating at what recognition confidence percentage must be attained for a phrase to NOT be rejected.

completionCorrelationID—identifier to be returned upon completion of phrase-set creation operation (via OnRecoPhraseSetCreationComplete event).

PromptAndListen(initialPrompt, helpPrompt, rejectionPrompt, timeoutPrompt, recoPhraseSetHandleList, completionCorrelationID)

Figure 3F:
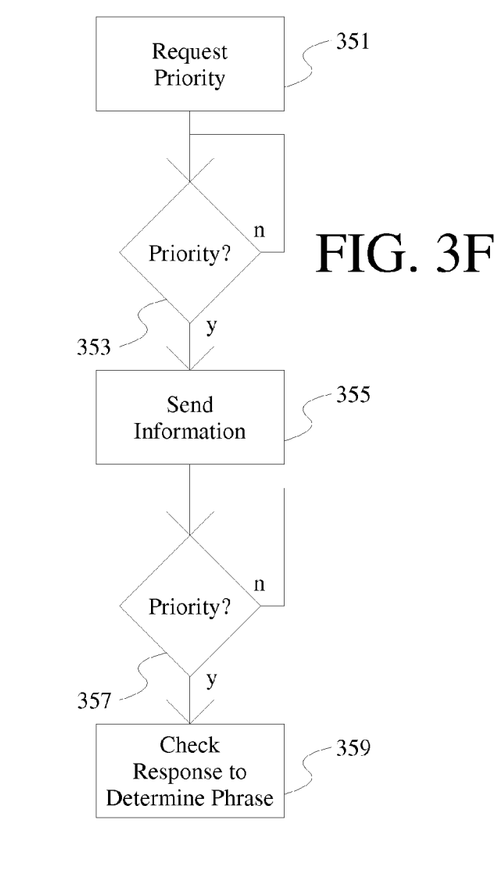

An exemplary flow for this command is shown in FIG. 3F. This command may prompt the user and listen for a recognized response. Priority may be required in this example, because an audio/visual prompt is being made. The system may first request priority 351. Once priority is acquired 353, the system then sends the packet of information 355 and waits for a response 357. Once a response is received, the system can then determine which response was given 359, based on, for example, an ID number. This operation may be asynchronous and completion may be indicated by a OnPromptAndListenComplete event which returns a completion reason and the recognized text.

recoPhraseSetHandleList—a list (in .NET, a List< >) of handles to one or more phrase sets that have already been created during this connection. A phrase that is recognized from any one of these phrase sets will be returned via the OnPromptAndListenComplete event.

initialPrompt—text to be spoken to user before listening starts.

helpPrompt—text to be spoken to user if they ask for help during listen.

rejectionPrompt—text to be spoken to user if they fail to speak a recognizable phrase.

timeoutPrompt—text to be spoken to user if they fail to speak a recognizable phrase within a timeout period.

completionCorrelationID—identifier to be returned upon completion of phrase-set creation operation (via OnPromptAndListenComplete event).

Other illustrative examples of vehicle control and interface with applications are also possible. By leveraging existing vehicle controls, applications can interact with the vehicle, vehicle passengers, and even other applications.

For example, in one illustrative embodiment, one or more applications or controls may both try to access a system resource (such as, but not limited to, a system output like a display or audio system).

In this illustrative example, priority rules are set by the vehicle computing system. The rules could, if desired, be set by a user, but in this example the system-set rules ensures consistent behavior over applications. For example, when a user activates a button control, the user expects an immediate or near immediate response. If another application was currently using the resource needed to indicate a button press (such as, but not limited to, a sound or display or input/output resource), the user may be confused when the button press is not acknowledged. Thus, in at least one illustrative example, manual control activation, for example, is given a high priority.

Figure 4:
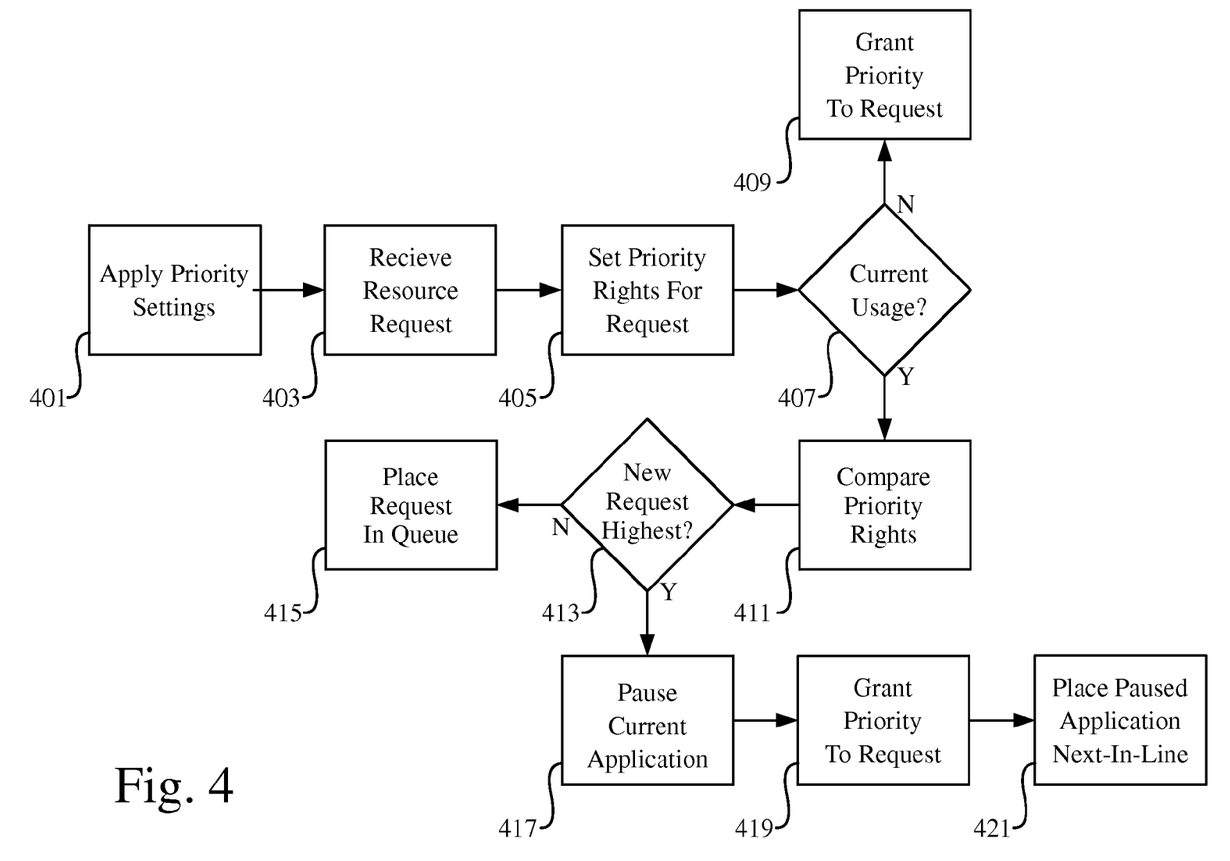
FIG. 4 shows an illustrative example of a process for application request prioritization.

FIG. 4 shows an illustrative example of a process for application request prioritization. In this illustrative example, priority settings are applied based on a preset paradigm 401. These priority settings dictate the prioritization granted to various access requests. Different vehicle functions and applications can have different priority levels assigned thereto, so that a developer or OEM can control the interface of these functions and applications with the vehicle in a predictable manner.

In this illustrative example, the system receives a request for usage of a system resource 403. This resource can include, but is not limited to, a navigation or other visual display output, the vehicle audio system, an input such as a button control or a microphone, etc.

Based on the applied priority settings and the requesting application or vehicle function, the process then sets a priority for the request 405. This priority can be used to determine where in line a request will fall, if more than one request is pending. Alternatively, the request may simply be bounced if queuing is not desired and there is already a higher priority function or application using the requested resource. Bouncing a request may return a fixed error code so that the requesting entity knows to try the request again if control of the resource is still desired.

Once the priority has been set for the request, the system checks to see if there is currently any usage of the requested resource 407. If there is no usage of the resource, then usage of the resource is given to the requesting entity 409.

Unless the entity completes usage of the resource before another higher priority entity requests the resource, it is possible, in this illustrative example, for the currently using entity to lose control of the resource and, in this example, be placed in a queue.

If the resource being requested by the requesting entity is currently being used by another entity, the process may compare the priority rights of the requesting entity with the priority rights of the entity currently using the resource 411.

In this manner, the system can determine whether the newly requesting entity has a higher or lower priority than the entity currently using the resource 413. If the new requesting entity has a higher priority, then the entity currently using the resource has its rights suspended 417 and the newly requesting entity is given priority over the resource 419.

In this example, the entity previously using the resource is then placed at the top of a queue 421 for resource usage once the new highest priority entity (the requesting entity) has completed usage of the resource.

If the entity requesting control of the resource does not have the highest priority, then the request is placed in a queue 415 at the appropriate position according to the priority of the requesting entity vs. the priorities of any queued requests.

This is simply one example of an algorithm for controlling priority and is not intended to limit the scope of the invention in any manner. Any suitable prioritization algorithm that grants priority to the appropriate entities in accordance with a prioritization scheme is appropriate.

Figure 5A:
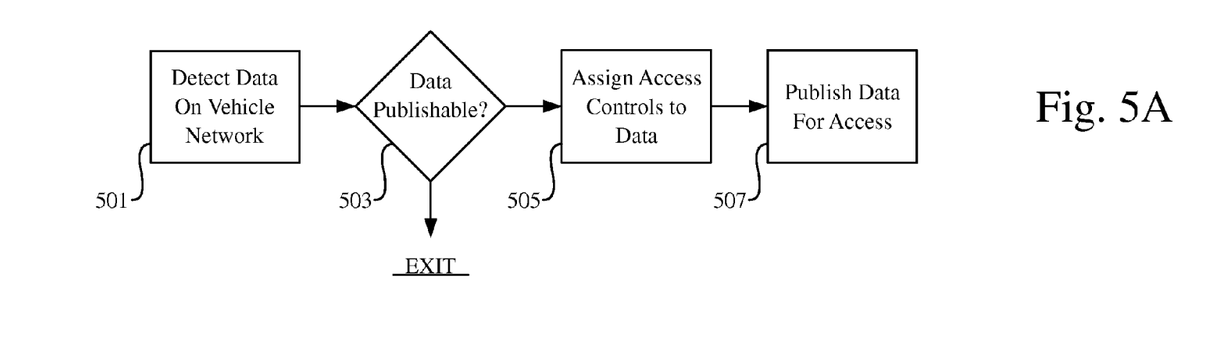
FIG. 5A shows an illustrative example of a process for data publication.

FIG. 5A shows an illustrative example of a process for data publication. Certain applications may desire to use data from a vehicle network (such as, but not limited to, a CAN network). Since it may be undesirable to have the applications tap directly into the vehicle network, in this example one instance of an exemplary process for data publication is shown. By publishing data to an accessible channel (or other suitable location), the process can allow authorized (or all) applications to access the vehicle data without exposing the vehicle network to application access. Of course, if desired, the applications could directly access the vehicle network as well.

In this illustrative embodiment, the process is monitoring the vehicle network for data being sent therethrough. If data is detected on the network 501, the system then determines if the data is of a publishable nature 503 (or is desired to be published). In alternative examples, the system could specifically look for certain data types based on requested types from applications. For example, in one embodiment, the system may ignore all data except that of a requested type. In another example, publishable data may be published whether or not it has been specifically requested.

In this embodiment, the data is published with an access control level that designates what level or type of entities can access the data 505. If published to a feed, data could also be open for public access once published, or the restrictions of access to the data could be controlled by a publication channel or by limited access rights to the publication list in general. In at least one embodiment, a subscriber has been approved for a particular data type at the point of subscription, so access controls on the data are not needed, since, in this embodiment, the data is sent directly to one or more approved subscribers.

Once the data has a security classification affiliated therewith, it is published for access 507. As previously noted, data deemed suitable for publication may be published without any controls directly applied to the data, and, if desired, access control can instead be applied by limiting access to the publication from a subscription or other similar process. In this illustrative embodiment, "published" data is simply sent to requesting entities and, if no requesting entities exist, the data is dumped. In other embodiments, a feed or repository may exist, so that late-arriving applications can retrieve previously published data.

As a non-limiting illustrative example, if a vehicle's speed were available for application usage, then when speed data was available on a vehicle network, it would be published and access to the data would be available to subscribing entities. Additionally or alternatively, speed would only be published if a subscribing entity requested speed data.

Figure 5B:
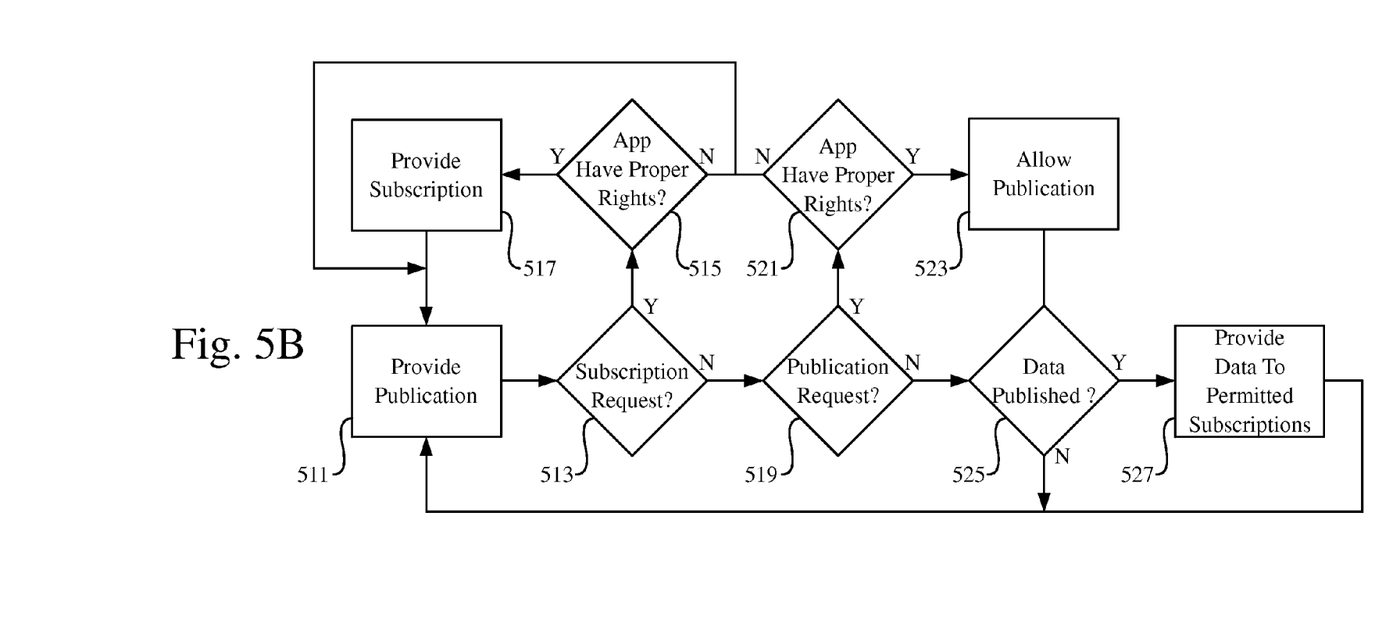
FIG. 5B shows an illustrative example of a process for data handling.

FIG. 5B shows an illustrative example of a process for data handling. In this illustrative example, a process for providing a publication (direct publication, channel, storage location, repository, etc.), a subscription request and fulfillment, and a data distribution event is shown. Each of these elements can be handled by a separate process if desired, and the process shown is for exemplary purposes only to describe the concepts of the event-handling therein.

In this illustrative embodiment, at least one publication is provided 511. In this example, the publication is direct publication to one or more subscribing entities, although a single feed or varying feeds with different access parameters may also be provided. Additionally or alternatively, the feed could be provided as a channel, a storage location, repository, etc.

The illustrative process then checks to see if any subscription requests are pending 513. Subscription requests may come from a variety of elements, including, but not limited to, in-vehicle applications, vehicle processes and remote process in communication with the vehicle. Even remote servers in communication with the vehicle may request subscription to a feed.

If a subscription request is pending, the process then checks to see if the requesting entity has proper access rights 515. In another example, a publication or feed may be open to all access requests, so an access right check may not be necessary.

If the subscription requesting entity does not have access rights, the process loops and looks for any other pending subscription requests. If the subscription requesting entity does have proper access rights, the process grants a subscription to the entity for a limited duration, indefinitely, until the application ends, until the vehicle is turned off, until a specific piece of data is obtained, etc.

If there are not subscription requests pending, in this embodiment, the process then checks to see if there are any publication requests pending 519. As with subscription requests, these may also require authentication, depending on how the system is configured. In alternative embodiments, the entity publishing data may be pre-approved, or a publication availability or feed may be open to all publication.

In this embodiment, the process checks to see if the requesting entity has proper rights to publish the subscription request 521. If the proper rights are present, the process allows the entity to publish a request (or to have access to a publication feed, for example, to publish future requests without authentication) 523. If the rights are improper, the process loops back to the beginning, in this illustrative embodiment.

If there are no subscription or publication access requests, the process checks to see if any data has been published 525. In this illustrative embodiment, the process delivers data to subscribing entities once it has been published 527. In other examples, the entities may simply poll the feed to see if there is any previously unobtained data available on the feed, or use other suitable means to provide published data to subscribers.

Figure 6:
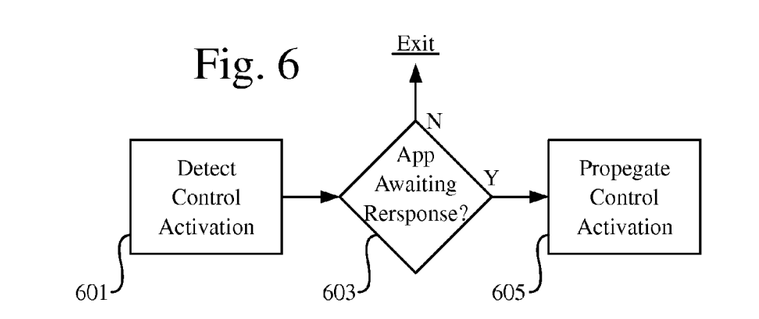
FIG. 6 shows an illustrative example of control press propagation.

FIG. 6 shows an illustrative example of control press propagation. In this illustrative example, the vehicle computing system is capable of relaying an interaction with a vehicle control to a requesting application.

Figure 7:
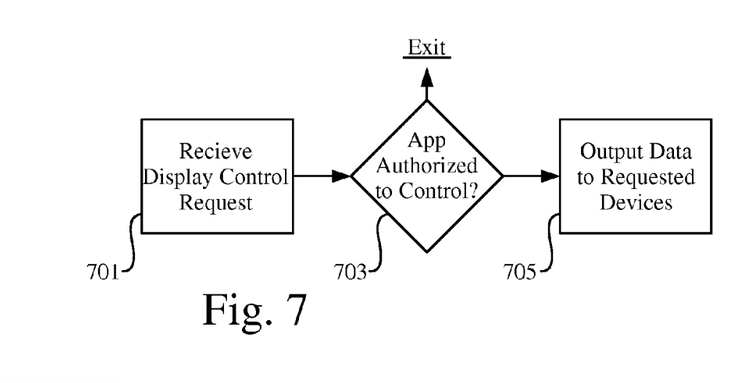
FIG. 7 shows an illustrative example of display control.

FIG. 7 shows an illustrative example of display control; and

Figure 8:
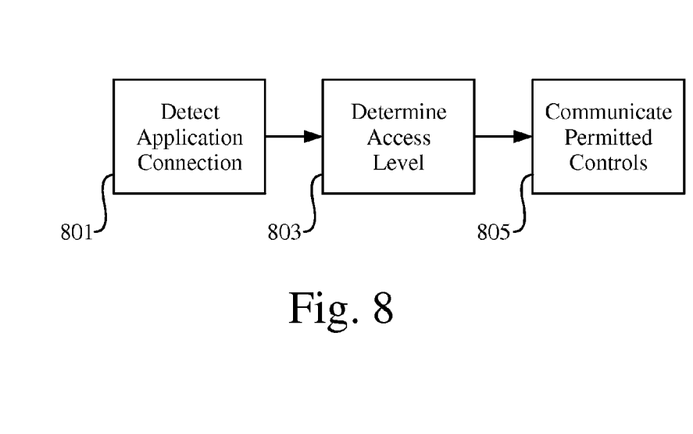
FIG. 8 shows an illustrative example of application initialization.

FIG. 8 shows an illustrative example of application initialization

While the invention has been described in connection with what are presently considered to be the most practical and preferred embodiments, it is to be understood that the invention is not to be limited to the disclosed embodiments, but on the contrary, is intended to cover various modifications and equivalent arrangements included within the spirit and scope of the appended claims.

What is claimed is:

1. A system comprising:
a processor configured to:
communicate wirelessly, through a transceiver, with a wireless device proximate to a vehicle;
receive a speak-alert command from a wireless device application, via the transceiver, including a string of text generated by the wireless application to be spoken through a vehicle audio system; and
instruct the vehicle audio system to suppress any presently playing audio and play the string of text as spoken communication.

2. A system comprising:
a processor configured to:
receive a create phrase command from a wireless device application, including a plurality of text strings, generated by the wireless device application, defining input to be listened for by the processor through a vehicle microphone input;
process microphone input to determine if the input matches any of the text strings; and
return an identifier to the wireless device application identifying which text string was matched.

3. The system of claim 2, wherein the processor is further configured to determine a degree-of-confidence with which an input matches a text string.

4. The system of claim 3, wherein the processor is configured not to return an identifier identifying which text string was matched unless the degree-of-confidence is above a predetermined threshold.

5. A system comprising:
a processor configured to:
receive a prompt-and-listen command from a wireless device application, including a first string of text to be used to prompt a vehicle occupant;
instruct at least one of a vehicle display and a vehicle audio system to output the first string of text in displayed and/or spoken format; and
listen for a response to the output string.

6. The system of claim 5, wherein the processor is further configured to obtain a priority right over at least one of the display and audio system for the purposes of outputting the first string of text.

7. The system of claim 6,
wherein the prompt-and-listen command further includes a second string of text to be used to help a vehicle occupant,
wherein the processor is configured to listen, through a microphone, for a help request, and
wherein if the processor receives a help request, the processor is further configured to instruct at least one of a vehicle display and a vehicle audio system to output the second string of text in displayed and/or spoken format.

8. The system of claim 6,
wherein the prompt-and-listen command further includes a third string of text to be used to reject user input,
wherein the processor is configured to listen, through a microphone, for user input, and
wherein if the processor receives user input that the processor is unable to properly handle, the processor is further configured to instruct at least one of a vehicle display and a vehicle audio system to output the third string of text in displayed and/or spoken format.

* * * * *